United States Patent [19]

Brauch et al.

[11] Patent Number: 4,843,298

[45] Date of Patent: Jun. 27, 1989

[54] FLASHLIGHT BATTERY CHARGER

[75] Inventors: Robert K. Brauch, Colorado Springs, Colo.; Raymond L. Sharrah, Collegeville, Pa.

[73] Assignee: Streamlight, Inc., Norristown, Pa.

[21] Appl. No.: 902,469

[22] Filed: Aug. 29, 1986

[51] Int. Cl.⁴ .................. H02J 7/00; H01M 10/46; F21L 1/00
[52] U.S. Cl. .................................. 320/2; 362/183
[58] Field of Search .................................. 320/2-6, 320/15, 16, 39, 40, 48, 56, 57, 54; 362/183; 340/636, 815.03

[56] References Cited

U.S. PATENT DOCUMENTS

| | | | |
|---|---|---|---|
| 3,281,637 | 10/1966 | Hultquist | 320/2 |
| 3,473,859 | 10/1969 | Kircher | 320/2 X |
| 3,829,676 | 8/1974 | Nelson et al. | 320/54 X |
| 4,084,123 | 4/1978 | Lineback et al. | 320/2 |
| 4,092,580 | 5/1978 | Prinze | 320/2 |
| 4,171,534 | 10/1979 | Strowe | 362/183 |
| 4,350,946 | 9/1982 | Prinze | 320/56 X |
| 4,354,092 | 10/1982 | Manabe et al. | 320/2 X |
| 4,357,648 | 11/1982 | Nelson | 362/183 |
| 4,388,673 | 6/1983 | Maglica | 362/183 |
| 4,389,139 | 8/1983 | Prinze | 362/183 X |
| 4,531,178 | 7/1985 | Uke | 362/183 X |

OTHER PUBLICATIONS

Advertising Brochure from Qualtech, Inc. about their Luma-Tech 4 Flashlight System, 1-5-1981.
Advertising Brochure from Streamlight, Inc. about their SL-20X, SL-35X, and SL-15X Flashlights, 1-1986.

Primary Examiner—R. J. Hickey
Attorney, Agent, or Firm—Dann, Dorfman, Herrell and Skillman

[57] ABSTRACT

A flashlight battery charger is provided for charging batteries contained within a flashlight. The charger includes a casing which receives an end portion of the flashlight in position to permit recharging. The casing includes a main case having a generally hollow interior and brace supports on opposite sides of the interior of the case. A cover is provided for enclosing the main case, the cover having a support brace projecting inwardly toward the hollow interior of the main case. A printed circuit board is held in position within the casing between the brace supports of the main case and the support brace on the cover. An electrical output terminal is supported on the casing for engaging and electrically coupling with the flashlight. A transformer supported within the casing has a primary winding which is connected with an input, such as a cordless plug, for connection with a source of a.c. power and a secondary winding which is connected with a rectifier so that d.c. current can be supplied from the electrical terminal of the charger to the flashlight to permit recharging. A light-emitting diode is connected in series between the secondary winding of the transformer and the electrical terminal to indicate current flow for recharging the batteries. A series of diodes is connected in parallel across the light-emitting diode to regulate the voltage applied to the light-emitting diode.

15 Claims, 2 Drawing Sheets

FLASHLIGHT BATTERY CHARGER

FIELD OF THE INVENTION

The present invention relates to a flashlight battery charger for recharging flashlight batteries and, more particularly, to a flashlight battery charger for recharging flashlight batteries while contained within a flashlight.

BACKGROUND OF THE INVENTION

Since the advent of rechargeable batteries, different types of battery chargers have become available for recharging the batteries. Unfortunately, many of the conventional battery chargers which are commercially available do not readily permit convenient use and operation. For example, many conventional chargers require the rechargeable batteries to be removed from the product and inserted into the charger before the batteries can be recharged. After recharging, the batteries must then be removed from the charger and reinserted back into the product.

To overcome the inconvenience of using conventional battery chargers which require the batteries to be removed from the product to permit recharging, products have now evolved which enable the batteries for the product to be recharged while the batteries are still contained within the product. For this purpose, electrical terminal connections are provided on the products which permit the products to be electrically connected to a charger apparatus so that the batteries of the product can be recharged without any need to remove the batteries from the product. To effect recharging of the batteries, the product is simply mounted onto the battery charger. After the recharging is complete, the product can be removed from the battery charger with re-energized batteries.

In the flashlight industry, battery chargers have been developed which enable the batteries of a flashlight to be recharged while still contained within the flashlight. To permit the batteries of a flashlight to be recharged without causing damage to the batteries, charging circuits must be utilized to convert a power supply signal, such as an A.C. signal from a conventional wall outlet, or a D.C. signal from an automobile battery, to a charging signal having predetermined parameters to effect safe recharging of the batteries. In some of the conventional systems, the necessary charging circuit is contained within the flashlight itself rather than in a separate holder. One of the drawbacks with locating the charging circuit in the flashlight, however, is that the manufacturing and production costs for each flashlight are significantly increased. Additionally, the versatility of recharging the flashlight is also restricted since different charging circuits are required for different types of power supplies. For example, one type of charging circuit is required when the batteries are to be recharged from an A.C. power source, such as a conventional wall outlet in a residence, and another type of charging circuit is required when the batteries are to be recharged from a D.C. power source, such as a car battery. Consequently, if one type of charging circuit is employed in the flashlight, recharging of the flashlight from the other types of power sources cannot be effected.

In other conventional charger arrangements, various components of the charging circuit are contained within a special holder for the flashlight. However, when this type of conventional charger is used with an A.C. power source, such as a conventional wall outlet, the requisite transformer for reducing the A.C. voltage from the power source to the desired magnitude is conventionally located externally of the flashlight holder. Typically, the transformer is incorporated within an assembly for plugging into the wall outlet. As a result, one casing is required to house the transformer within the plug assembly at the wall outlet and a separate casing is required to house the remaining components of the charging circuit within the flashlight holder. Not only are manufacturing and assembly costs relatively high because of the requirement for dual casings, but this type of charger is not always convenient to use. Since furniture or other equipment is often placed or positioned in front of wall outlets, thereby partially blocking or obscuring the wall outlets, sufficient space or clearance is not always available to enable a plug assembly incorporating a transformer to be plugged into such outlets. Even when the outlets are not directly blocked or obscured, it is often necessary to snake the plug or plug assembly behind furniture or other equipment while en route to an otherwise unobscured outlet. Unless sufficient clearance is provided for a plug assembly incorporating a transformer along the entire route to the outlet, connection with the wall outlet is not possible.

In accordance with the present invention, a flashlight battery charger is provided which overcomes many of the problems associated with conventional flashlight battery chargers. According to the present invention, an extremely compact and highly versatile charging unit is provided for use with A.C. power sources. The compact charging unit is reliable in operation and is economical to manufacture and assemble.

SUMMARY OF THE INVENTION

In accordance with the present invention, a highly compact flashlight battery charger is provided for use with an A.C. power source to recharge flashlight batteries while contained within a flashlight. The charger has specific application for recharging flashlights having an end portion with an electrical terminal connector which is electrically connected with the batteries contained within the flashlight.

The charger includes a casing having a flashlight charging area for receiving the end portion of the flashlight in position to permit recharging. For this purpose, the casing may include an integral socket at the flashlight charging area to properly guide the end portion of the flashlight into proper position to permit recharging.

Electrical terminal means is supported in the charging area of the casing for electrically coupling with the terminal connector of the flashlight when the flashlight is properly positioned at the charging area of the casing for recharging. The electrical terminal means may be disposed within a base portion of the casing socket to facilitate the electrical coupling between the electrical terminal means of the charger and the terminal connector of the flashlight as the socket guides the end portion of the flashlight into proper position to effect the desired electrical coupling.

In order to reduce the magnitude of the voltage from an A.C. power source to a desired level, a transformer having a primary winding and a secondary winding is supported and housed within the casing of the charger. The transformer converts A.C. voltage supplied to the primary winding of the transformer to a desired A.C. voltage at the secondary winding. Input means, such as a conventional plug and cord, is electrically connected with the primary winding of the transformer to enable the charger to be connected to a source of A.C. power, such as a conventional wall outlet in a residence. The input means enables A.C. power to be supplied from the A.C. power source to the primary winding of the transformer. In an alternative arrangement, the input means may simply include a cordless plug which is supported in fixed position directly on the charger casing. In the alternative arrangement, the charger may be plugged directly into a source of A.C. power, such as a conventional wall outlet, without requiring the use of any electrical cord.

Rectifier means is connected with the secondary winding of the transformer and the electrical terminal means of the charger for rectifying A.C. current from the secondary winding of the transformer to a D.C. current. The rectifier means enables D.C. current to be supplied to the electrical terminal means of the charger so that D.C. current flows to the terminal connector of the flashlight to recharge the flashlight batteries when the flashlight is placed into position for recharging at the flashlight charging area of the charger.

BRIEF DESCRIPTION OF THE DRAWINGS

The foregoing summary, as well as the following detailed description of the preferred embodiments of the present invention, will be better understood when read in conjunction with the accompanying drawings, in which.

DESCRIPTION OF THE PREFERRED EMBODIMENTS

Figure 1:
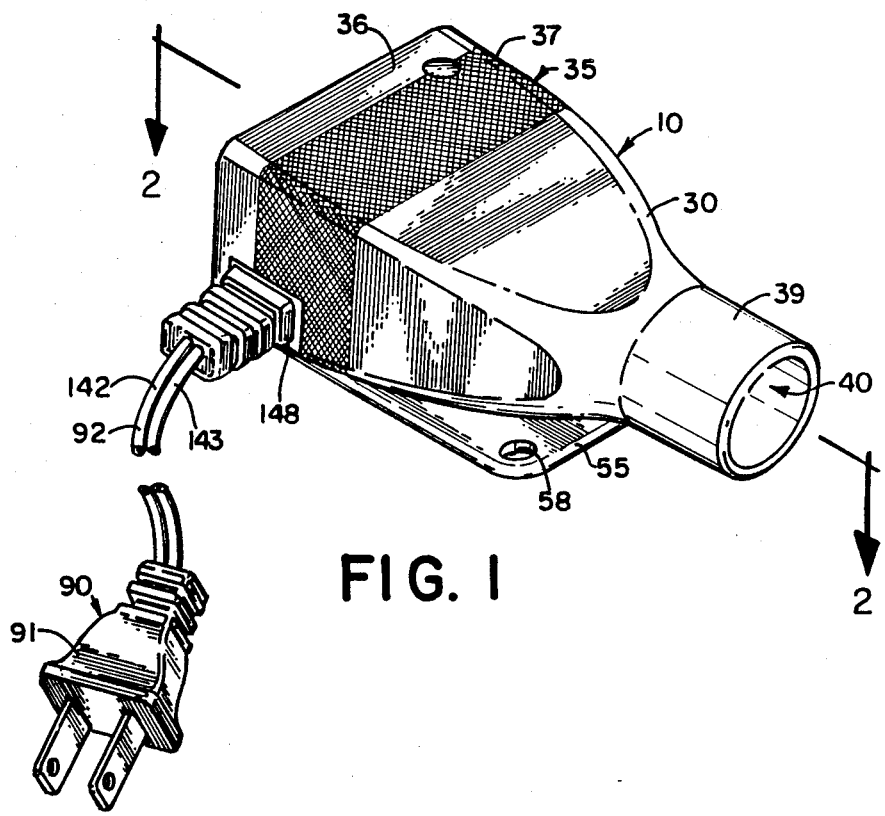
FIG. 1 is a perspective view of a flashlight battery charger with an electrical cord and plug in accordance with a preferred embodiment of the present invention.
Figure 2:
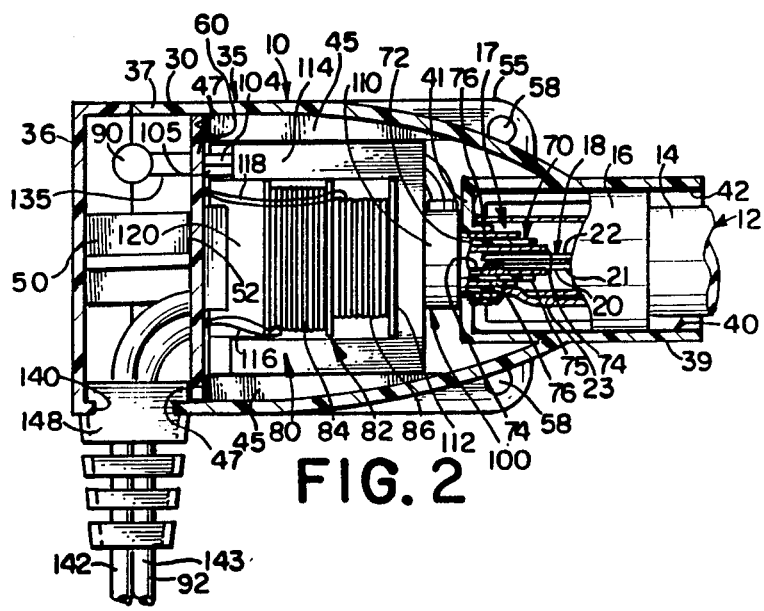
FIG. 2 is a sectional view of the battery charger, with parts cut away, generally taken along line 2—2 of FIG. 1 but with an end portion of a flashlight having parts cut away positioned within the charger.

Referring to FIGS. 1 and 2, a flashlight battery charger, generally designated 10, is depicted for recharging rechargeable flashlight batteries contained within a flashlight, generally designated 12. The flashlight 12 may be of a variety of different types, such as a miniature flashlight utilizing AA size rechargeable batteries. The flashlight 12 includes a casing 14 having an end portion 16 in the form of a removable end cap which supports an electrical terminal connector generally designated 18. The electrical terminal connector 18 is electrically connected internally of the flashlight 12 with the rechargeable batteries contained within the flashlight so that the batteries may be recharged without being removed from the flashlight.

Conventional flashlights having removable end caps without terminal connectors can also be readily adapted to permit recharging. A conventional flashlight can be converted into a rechargeable flashlight simply by replacing the original end cap of the conventional flashlight with a new end cap 16 having a desired terminal connector 18. Specifically, the original end cap of a conventional flashlight can typically be unscrewed and removed from the flashlight and then a new end cap 16 having an electrical terminal connector 18 can be inserted into place to thereby effect the conversion of the conventional flashlight into a rechargeable flashlight.

As illustrated in FIG. 2, the electrical terminal connector 16 of the flashlight 12 is provided as a cylindrically shaped receptacle 17 supported in fixed portion relative to the flashlight at the end portion of the flashlight. The receptacle is recessed into the end cap of the flashlight to protect the receptacle conductors and to prevent any electrical shorting of the receptacle conductors by inadvertent contact with external objects. The receptacle 17 includes a central conductor pin 20 having split apart pin arms 21 and 22 which are radially compressible toward one another. The conductor pin 20 is internally connected within the flashlight to one polarity of the rechargeable batteries. The receptacle 17 also includes an outer conductor clip 23 in the form of a spring arm which is internally connected to the opposite polarity of the batteries. The central conductor pin and the outer conductor clip are held in a spaced-apart relationship to prevent electrical shorting and are separated by insulating material.

In order to effect the recharging of the flashlight batteries, the flashlight battery charger, generally designated 10, receives and holds the flashlight 12 in position for recharging at a flashlight charging area on the charger. The charger includes an electrically insulative casing 30, which is separately molded from a resinous material in two separate pieces as a main case 35 and an and cap 36 in the form of an end or base cover. The main case 35 has a generally hollow interior for housing the electrical circuitry of the charger and is contoured from an a larger cross-sectional open-ended base portion 37 toward a smaller cross-sectional neck portion 39. The base portion 37 has an open end to permit the electrical circuitry of the charger to be inserted into the main case 35 before the end cover 36 is sealed to the main case to enclose the circuitry.

The neck portion 39 of the main case 35 is configured as a socket 40 which is integrally formed on the casing at the flashlight charging area of the charger. The socket 40 is configured to receive the end portion of the flashlight and to guide the end portion of the flashlight into proper position at the charging area of the charger to permit recharging. The socket 40 has a generally hollow interior with generally tubular sidewalls 42 and a support base 41 at the bottom of the socket 40.

A series of brace supports in the form of generally parallel support ribs 45 are integrally molded on opposite sides of the hollow interior of the main case 35 to provide a generally planar support ledge 47 on opposite sides of the interior of the main case 35. The support ledge 47 is recessed into the interior of the main case proximate the open end of the base portion 37 of the main case 35.

The end cover 36 is configured to mate with the main case 35 at the open end of the main case 35 to enclose the case. After the charger is fully assembled with the charger circuitry contained within the hollow interior of the main case 35, the end cover 36 can be secured in position at the open end of the main case by appropriate sealing, such as sonic sealing or heat sealing. A support brace 50 is integrally molded to the inner surface of the end cover 36 so that the support brace 50 projects a short distance into the hollow interior of the main case. The support brace 50 provides a generally planar support surface 52, which is oriented generally parallel to, but spaced apart from, the support ledge 47 provided by the support ribs 45 on the interior of the main case 35. The respective support ledges 47 on the main case 35 and the support surface 52 on end cap 36 hold and support a printed circuit board 60 for the charger circuitry fixed position within the casing 30 when the end cover 36 is sealed to the main case 35 after assembly of the charger.

To enable the charger to be mounted onto a mounting surface of a structure, such as the outer surface of a wall, a mounting plate 55 is fixed to the exterior of the casing and may be integrally molded with the casing. The mounting plate provides an exterior generally planar mounting surface 56 which generally conforms to a generally planar outer surface of a wall or other similar structure onto which the charger is to be mounted. The conforming generally planar surfaces of the wall and the mounting plate 55 enable the charger 10 to be mounted onto the surface of the wall with the generally planar exterior surface 56 of the mounting plate 55 in generally flush contact with the generally planar surface of the wall. By providing flush contact between the mounting plate and the wall surface, the charger is more firmly and rigidly held in position on the surface of the wall. So that the charger can be secured and affixed to the wall, the mounting plate 55 includes screw holes 58 for screws.

In order to provide electrical coupling between the battery charger 10 and the terminal connector 16 of the flashlight 12, the battery charger 10 includes electrical terminal means, generally designated 70, positioned in the charging area of the battery charger. The electrical terminal means 70 is configured to electrically couple with the terminal connector of the flashlight when the flashlight is properly positioned within the socket 40 at the charging area of the charger 10 for recharging. For this purpose, the electrical terminal means 70 includes a terminal plug 72 which is supported within the socket 40 and is configured to engage and mate with the electrical terminal connector of the flashlight to effect electrical coupling between the charger 10 and the flashlight 12 and to support and hold the flashlight in position on the battery charger. The terminal plug 72 is supported in fixed position relative to the casing and projects into the interior of the socket 40 from an opening in the base 41 of the socket. The socket 40, which is intergrally molded as part of the casing 30, receives the end portion 16 of the flashlight 12 and guides the end portion 16 of the flashlight 12 into proper position so that the electrical terminal connector 18 on the end of the flashlight electrically couples with the electrical terminal plug 72 of the charger 10.

As the flashlight is inserted, the socket 40 guides the flashlight and causes the receptacle 17 on the end of the flashlight to register with the terminal plug 72 on the charger so that the plug 72 can be inserted into the receptacle 17 to provide proper electrical contact therebetween. For this purpose, the terminal plug 72 includes a pair of generally coaxial conductors 74 and 76. One of the coaxial conductors of the terminal plug is provided as an inner generally tubular conductor core 74 for receiving and electrically engaging the conductor pin 20 of the flashlight receptacle 17 and the other coaxial conductor of the conductor plug 72 is provided as an outer generally tubular conductive sleeve 76 for engaging the conductor clip 23 within the receptacle 17 of the flashlight. The coaxial conductors of the terminal plug are separated by an intermediate generally tubular insulator 75.

As the conductor pin 20 is inserted into the conductor core 74 of the terminal plug 72, the pin arms 21 and 22 of the conductor pin 20 are compressed together to provide a spring force which helps to hold the terminal plug 72 in engagement with the receptacle 17 and to hold the flashlight in position on the charger. Additionally, the conductor clip 23 of the receptacle 17 engages the outer conductive sleeve 76 of the terminal plug 72 with a spring force to hold the plug 72 in engagement with the receptacle 17 and to hold the flashlight 12 on the charger 10. In the present embodiment, the engagement between the terminal plug 72 of the charger and the receptacle 17 of the flashlight hold the flashlight in position on the charger. In alternate embodiments, the tubular sidewalls 42 of the socket 40 may also engage the flashlight to hold the flashlight in position. However, by providing clearance between the tubular sidewalls 42 of the socket 40 and the exterior of the flashlight, the socket 40 may accept larger diameter flashlights than would otherwise be possible.

Figure 4:
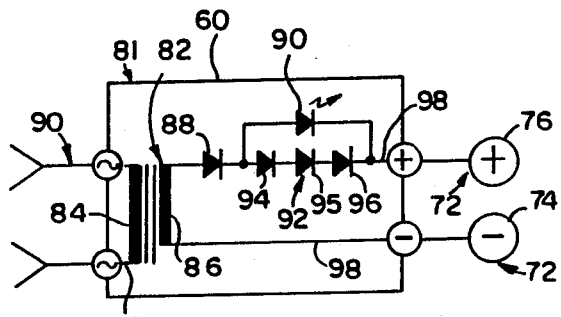
FIG. 4 is a general schematic diagram of the electrical circuitry of the battery charger.

Referring to FIG. 4, the battery charger 10 includes a charging circuit, generally designated 81, housed within the casing 14 for converting a signal from a power supply to a signal of predetermined parameters required for charging the batteries within the flashlight. The charging circuit 81 converts A.C. power, which may be supplied from a conventional wall outlet, for example, to the necessary D.C. power supply required for recharging the flashlight batteries. The charging circuit 81 includes a transformer 82 having a primary winding 84 and a secondary winding 86 for converting A.C. voltage supplied to the primary winding to a desired A.C. voltage at the secondary winding. Input means 90, such as an electrical plug 91 and cord 92 as shown in FIG. 1, is electrically connected with the primary winding 84 of the transformer 82 to permit connection of the charger to a source of A.C. power to enable the A.C. power to be supplied to the primary winding of the transformer. The secondary winding 86 of the transformer 82 is connected with the coaxial conductors 74 and 76 of the terminal plug 72.

Since D.C. power must be supplied from the terminal plug 72 of the charger to the receptacle 17 of the flashlight to permit recharging, rectifier means is connected with the secondary winding 86 of the transformer 82 and with the terminal plug 72 of the charger for rectifying A.C. current from the secondary winding of the transformer to a D.C. current. To rectify the A.C. current from the secondary winding 86 of the transformer, a rectifier diode 88 is connected between one side of the secondary winding 86 of the transformer and one of the coaxial conductors 76 of the terminal plug 72. As connected in FIG. 4, the diode 88 serves as a half-wave rectifier.

In order to indicate to a user that the batteries within the flashlight are being recharged, the charger 10 includes indicator means connected in series between the secondary winding 86 of the transformer and the terminal plug 72. The indicator means is in the form of a light emitting diode 90, which is connected in series between the rectifier diode 88 and one of the conductors 76 of the terminal plug 72. The light emitting diode emits light to indicate when current flows through the secondary winding 86 of the transformer and through the batteries of the flashlight. In order to regulate the voltage which is applied across the light emitting diode 90, the charging circuitry includes a shunt voltage regulator 92 connected in parallel across the light emitting diode 90. As shown in FIG. 4, the shunt voltage regulator is provided by three diodes 94, 95 and 96 connected in series across the light emitting diode 90. The conductors used to interconnect the circuit elements of the charging circuit are provided as conductive paths 98 on the printed circuit board 60.

Figure 3:
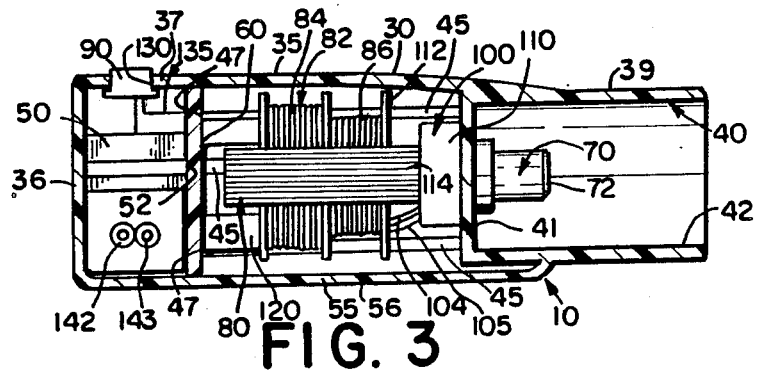
FIG. 3 is a side sectional view illustrating the battery charger of FIG. 1 with a side portion of the outer casing removed to show the internal parts of the charger, but with some internal parts being cut away.

Referring to FIGS. 2 and 3, the electrical terminal means of the battery charger is provided as an integral plug assembly unit 100. The plug assembly unit includes an external portion which projects externally from the case 35, the external portion including the terminal plug 72 which is dimensioned to pass through the opening in the bottom of the socket 40 so as to project into the interior of the socket. To support the terminal plug 72 in position in the socket 40, the plug assembly unit 100 includes an internal portion contained within the main case in the form of an integral enlarged insulative base portion 110, 80 which supports the terminal plug 72. The base portion 110 is dimensioned to a sufficient size to overlap the opening at the base 41 of the socket 40 within the interior of the main case 35. The enlarged base 110 of the plug assembly unit 100 stops the plug assembly unit 100 at the base of the socket 40 and prevents the plug assembly unit 100 from being removed from the interior of the main case 35 through the opening at the base 41 of the socket 40. The plug assembly unit 100 includes conductor leads 104 and 105 which are connected internally of the plug assembly unit with the respective coaxial conductors 74 and 76 of the terminal plug 72. The conductors 104 and 105 of the plug assembly unit extend from the plug assembly unit 100 for connection to the printed circuit board 60 where the ends of the conductors 104 and 105 are soldered to the printed circuit board at appropriate locations along the conductive paths 98 on the printed circuit board to permit electrical connection with the secondary winding 86 of the transformer 82 and the light emitting diode 90.

The plug assembly unit 100 is held in position within the interior of the main case 35 by a transformer assembly 80 which incorporates transformer 82. The primary winding 84 and the secondary winding 86 of the transformer 82 are wrapped around a suitable bobbin 112. The transformer assembly 80 further includes a frame 114 having high magnetic permeability which surrounds bobbin 112 and the primary and secondary windings 84 and 86 of the transformer 82. Lead connections 116 from the primary winding 84 and lead connections 118 from the secondary winding 86 are soldered to the printed circuit board 60 at the appropriate places along the conductive paths 98 on the printed circuit board.

To enable the circuitry to be inserted into the casing 30 as a unit, the plug assembly unit 100 may be secured to an outer surface of the magnetically conductive frame 114 of the transformer 82 in position to enable the terminal plug 72 to be inserted into the socket 40 through the opening in the base 41 of the socket 40. The bobbin 112 of the transformer 82 is, in turn, secured to a support stand 120 of the transformer assembly 110 on the opposite side of the transformer 82 from the plug assembly unit 100. The support stand 120 is then affixed to the printed circuit board 60 so that the plug assembly unit 100 and the transformer assembly 80 are held in position on the printed circuit board 60 as a unit.

The light emitting diode 90 is positioned in registry with an accommodating opening 130 in the casing 30. The opening 130 in the casing 30 for the light emitting diode 90 is provided by mating half-openings in the main case 35 and the end cap 36 so that the light emitting diode 90 is held in position between the end cap 36 and the main case 35 when the end cap 36 is secured to the main case 35. Conductive leads 135 from the light emitting diode 90 are inserted through openings in the printed circuit board 60 and are soldered to appropriate conductive paths 98 on the printed circuit board.

The electrical input cord 92 for the charger 10 passes through an opening 140 in the casing 30 so that the cord conductors 142 and 143 can be soldered to the appropriate conductive paths on the printed circuit board 60. The cord 92 passes through the casing 30 through the opening 146 which is provided by mating half-openings in the end cap 36 and the main case 35. When the end cap 36 is secured to the main case 35, a grommet 148 for the cord 92 is held in position in the opening 140.

After the appropriate conductive leads for the various circuit elements are soldered to the printed circuit board 60, the printed circuit board 60 can be inserted into the generally hollow interior of the main case 35. The printed circuit board 60 rests against the support ledge 47 provided by the support ribs 45 on opposite sides of the main case 35 with the enlarged base portion 110 of the plug assembly unit 100 engaging and resting against the base 41 of the socket 40. When the end cap 36 is secured into position on the main case 35, the support brace 50 projecting from the end cap 36 engages the printed circuit board 60 on the opposite side of support ledge 47 on main case 35 so that the printed circuit board 60 is snugly held in position between the support ledge 47 on the interior of the main case 35 and the support brace 50 on the interior of the end cap 36. With the printed circuit board 60 firmly held in position, the transformer assembly 80 and the plug assembly unit 100 are then held in a snug fixed position between the printed circuit board 60 and the base 41 of the socket 40 of the casing 30.

The assembled charger 10 may then be utilized for recharging flashlight batteries while contained within a flashlight. The charger can be plugged into a source of A.C. power, such as a conventional wall outlet, and the charging circuitry will provide the terminal plug 72 in the socket 40 of the charger 10 with a source of D.C. power. When the flashlight is inserted into proper position on the battery charger so that the terminal plug 72 of the charger 10 electrically couples with the receptacle 17 on the end of the flashlight 12, an appropriate source of D.C. power will be provided to recharge the flashlight batteries.

Figure 5:
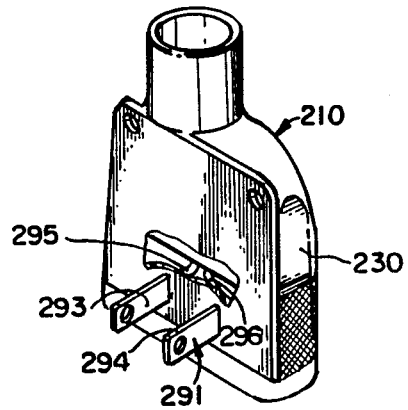
FIG. 5 is a reverse perspective view, partially cut away, of a battery charger having a cordless plug mounted directly onto the charger in accordance with another preferred embodiment of the present invention.

Referring to FIG. 5, a flashlight battery charger 210 is depicted which is substantially the same as the battery charger 10 depicted in FIGS. 1-4. The primary difference between the battery charger 10 depicted in FIGS. 1-4 and the battery charger 210 depicted in FIG. 5 is that the charger 210 depicted in FIG. 5 includes a cordless plug, generally designated 291, for connection with a source of A.C. power.

As shown in FIG. 5, the conductors 293 and 294 of the plug 291 are held in fixed position relative to the charger casing 230. The plug conductors 293 and 294 are supported in fixed position on the casing 230 and are connected respectively by conductor leads 295 and 296 with the primary winding of the transformer. The conductor leads 295 and 296 are soldered to the printed circuit board at appropriate positions along the conductor paths 98 on the printed circuit board 60. As such, the charger 210 depicted in FIG. 5 functions and operates in substantially the same manner as the charger 10 depicted in FIGS. 1–4 except that the electrical cord 92 employed with the charger 10 depicted in FIGS. 1–4 has been eliminated.

From the foregoing description and the accompanying drawings, it can be seen that the present invention provides a flashlight battery charger which is both convenient to assemble and easy to operate. It should be recognized, however, that changes or modifications may be made to the above-described embodiments without departing from the broad, inventive concepts of the invention. It is, therefore, understood that the invention is not limited to the particular embodiments which are disclosed but is intended to cover all modifications and changes which are within the scope and spirt of the invention as defined by the appended claims.

What is claimed is:

1. A flashlight battery charger for recharging batteries contained within a flashlight, the flashlight having an electrical terminal connector that is connected with the batteries to permit recharging of the batteries within the flashlight, the charger comprising:
    (A) a casing having a flashlight charging area for receiving the flashlight to permit recharging, said casing including (a) a main case having a generally hollow interior and supports on opposite sides of the interior of the main case and (b) a cover for enclosing the main case having a support brace projecting inwardly toward the hollow interior of the main case;
    (B) electrical terminal means in the charging area for electrically coupling with the terminal connector of the flashlight when the flashlight is positioned at the charging area for recharging;
    (C) a transformer supported within the casing having a primary winding and a secondary winding for converting A.C. voltage supplied to the primary winding to a desired A.C. voltage at the secondary winding;
    (D) input means electrically connected with the primary winding of the transformer for connection to a source of A.C. power to enable the A.C. power to be supplied to the primary winding of the transformer;
    (E) rectifier means connected with the secondary winding of the transformer and the electrical terminal means of the charger for rectifying A.C. current from the secondary winding of the transformer to provide a D.C. current at the electrical terminals means of the charger to enable D.C. current to flow to the terminal connector of the flashlight to recharge the batteries when the flashlight is positioned at the charging area for recharging; and
    (F) a printed circuit board for selected charger circuitry internally supported in the casing wherein the supports on the opposite sides of the interior of the main case provide generally planar support ledges for the printed circuit board at opposite sides of the interior of the main case and wherein the support brace on the cover provides a generally planar support surface spaced apart from and oriented generally parallel with the support ledges for holding and supporting the printed circuit board therebetween so that said circuit board is held in position within the casing between the supports on the opposite sides of the interior of the main case and the support brace on the cover when the cover is secured to the main case.

2. The charger in accordance with claim 1 comprising indicator means connected in series between the secondary winding of the transformer and the electrical terminal means to indicate when current flows through the secondary winding of the transformer and the batteries of the flashlight whenever the flashlight is in position for recharging at the flashlight charging area.

3. The charger in accordance with claim 2 wherein said indicator means includes a light emitting diode for emitting light to indicate when current is flowing through the secondary winding of the transformer and the batteries of the flashlight; and wherein said charger includes a shunt voltage regulator having diode means connected in parallel across the light emitting diode to regulate the voltage applied to the light emitting diode.

4. A flashlight battery charger for recharging batteries contained within a flashlight, the flashlight having an electrical terminal connector that is connected with the batteries to permit recharging of the batteries within the flashlight, the charger comprising:
    (A) a casing having a flashlight charging area for receiving the flashlight to permit recharging, said casing including (a) a main case having a generally hollow interior and supports on opposite sides of the interior of the main case and (b) a cover for enclosing the main case having a support brace projecting inwardly toward the hollow interior of the main case;
    (B) electrical terminal means in the charging area for electrically coupling with the terminal connector of the flashlight when the flashlight is positioned at the charging area for recharging;
    (C) input means for electrical connection to a source of electrical power; and
    (D) a printed circuit board having conductive paths electrically connected with the input means and the electrical terminal means internally supported within the casing wherein the supports on the opposite sides of the interior of the main case provide generally planar support ledges for the printed circuit board at opposite sides of the interior of the main case and wherein the support face on the cover provides a generally planar support surface spaced apart from and oriented generally parallel with the support ledges for holding and supporting the printed circuit board therebetween so that said circuit board is held in position within the casing between the supports on the opposite sides of the interior of the main case and the support brace on the cover when the cover is secured to the main case.

5. The charger in accordance with claim 3 wherein the shunt voltage regulator includes a plurality of diodes connected in series across the light emitting diode.

6. The charger in accordance with claim 1 or 4 comprising a mounting plate fixed to the casing having a surface conforming to a surface of a structure onto which the charger is to be mounted and means to enable the charge to be mounted onto the structure with the respective surfaces in generally flush contact with one another.

7. The charger in accordance with claim 1 or 4 wherein the input means includes a cordless plug supported in fixed position on the casing.

8. The charger in accordance with claim 1 or 4 wherein said casing includes an integral socket at the charging area for receiving a portion of the flashlight having the electrical terminal connector and for guiding the portion of the flashlight having the electrical terminal connector into position so that the electrical terminal connector on the flashlight electrically couples with the electrical terminal means of the charger.

9. The charger in accordance with claim 8 wherein said electrical terminal means is supported within the socket and is configured to engage and mate with the electrical terminal connector of the flashlight to hold the flashlight in position on the charger.

10. The charger in accordance with claim 8 wherein the portion of the flashlight having the electrical terminal connector is an end portion of the flashlight and wherein further said socket is configured to guide the end portion of the flashlight into position so that the electrical terminal connector on the end portion of the flashlight electrically couples with the electrical terminal means of the charger.

11. The charger in accordance with claim 10 wherein said electrical terminal connector of the flashlight includes a receptacle supported in fixed position at the end portion of the flashlight having a central conductor pin and an outer conductor clip contained within the receptacle and wherein said electrical terminal means of the charger includes a terminal plug supported in fixed position relative to the casing having a pair of generally coaxial conductors with one of the conductors of the terminal plug being an inner generally tubular conductive core for receiving and electrically engaging the conductor pin on said flashlight and the other conductor of the terminal plug being an outer generally tubular conductive sleeve for electrically engaging the conductor clip on said flashlight.

12. The charger in accordance with claim 1 wherein said main case includes an opening for the electrical terminal means at the charging area of the casing and wherein an external portion of the electrical terminal means projects from the opening at the charging area of the casing and an internal portion of the electrical terminal means is contained within the main case, the internal portion being of sufficient size relative to the opening to prevent the electrical terminal means from being removed outwardly through the opening in the main case, and wherein further said transformer is disposed in the main case generally intermediate the printed circuit board and the internal portion of electrical terminal means when the cover is secured to the main case so that the transformer and the electrical terminal means are held in generally fixed position relative to the casing.

13. The charger in accordance with claim 1 wherein the printed circuit board includes conductive paths on the board, and the electrical terminal means, the input means, and the primary and secondary windings of the transformer are each electrically connected in a selected manner with the conductive paths on the circuit board.

14. The charger in accordance with claim 1 or 4 wherein the support ledges at the opposite sides of the interior of the main case are recessed into the interior of the main case and the support brace is dimensioned to project into the main case when the cover is secured to the main case.

15. The charger in accordance with claim 1 or 4 wherein each of the supports on the opposite sides of the interior of the main case include a series of generally parallel support ribs which provide the support ledges at the respective opposite sides of the main case.

* * * * *